United States Patent [19]

Berger

[11] Patent Number: 5,563,456

[45] Date of Patent: Oct. 8, 1996

[54] SOLAR POWERED ANNUNCIATOR

[75] Inventor: Walter R. Berger, Houston, Tex.

[73] Assignee: Murphy Management Inc.

[21] Appl. No.: 127,203

[22] Filed: Sep. 24, 1993

Related U.S. Application Data

[63] Continuation-in-part of Ser. No. 98,257, Jul. 29, 1993, Pat. No. 5,438,225, which is a continuation of Ser. No. 832,122, Feb. 6, 1992, abandoned.

[51] Int. Cl.$^6$ .................................................. H02J 7/34
[52] U.S. Cl. .............................. 307/66; 307/87; 320/56
[58] Field of Search ............................ 307/64–66, 72, 307/75, 76, 80, 81, 85, 86, 87, 23; 323/906; 136/293; 320/48, 56; 340/517, 521, 802

[56] References Cited

U.S. PATENT DOCUMENTS

| | | |
|---|---|---|
| 3,222,535 | 12/1965 | Engelhardt . |
| 3,264,613 | 8/1966 | Stolle . |
| 3,893,014 | 7/1975 | Vacek ........................................ 307/76 |
| 3,965,469 | 6/1976 | Ryan . |
| 3,980,996 | 9/1976 | Greenspan et al. ..................... 320/1 X |
| 4,074,255 | 2/1978 | Munt . |
| 4,136,660 | 1/1979 | Palmer et al. . |
| 4,164,145 | 8/1979 | Aron ........................................ 73/293 |
| 4,165,477 | 8/1979 | Conte ....................................... 320/61 |
| 4,246,493 | 1/1981 | Beeghly . |
| 4,323,894 | 4/1982 | Wood et al. ............................. 340/764 |
| 4,336,463 | 6/1982 | Beeghly . |
| 4,523,460 | 6/1985 | Strickler et al. . |
| 4,681,515 | 7/1987 | Allen ....................................... 417/218 |
| 4,827,206 | 5/1989 | Speas ..................................... 323/906 X |
| 4,827,246 | 5/1989 | Dolan et al. ......................... 323/906 X |
| 4,843,525 | 6/1989 | Williams ................................. 362/157 |
| 4,888,702 | 12/1989 | Gerken et al. ............................ 320/40 |
| 4,963,811 | 10/1990 | Weber ..................................... 307/66 |

OTHER PUBLICATIONS

Frank W. Murphy Mfr., *Selective Tattletale: Specifications, Operations and Maintenance Manual* Jan. 1, 1986.

Rony, Peter R.; "Logic and Memory Experiments Using TTL Integrated Circuits", Book 2; Sams and Co. Inc.; Indianapolis, Indiana; 1979; pp. 165, 168, 169.

Primary Examiner—Fritz Fleming
Attorney, Agent, or Firm—Fulbright & Jaworski LLP

[57] ABSTRACT

A combination shut-down trigger and annunciator may be advantageously powered by a photoelectric power supply. The shut down trigger and annunciator can include a fault detection unit responsive to a plurality of fault condition sensor inputs. A fault condition identification storage element is connected to the fault detection unit and a display is connected to the fault condition identification storage element. The photoelectric power supply is then connected to the fault condition identification storage element. The photoelectric power supply may be provided with a battery backup system for use when there is insufficient light incident on a photo cell to power system. The battery backup may be a rechargeable battery in the power supply can include a battery charger. The configuration of the power supply, including the photocell battery charger and backup battery allows the system to operate without drawing power from an engine CD ignition power supply.

21 Claims, 9 Drawing Sheets

SOLAR POWERED ANNUNCIATOR

This is a continuation-in-part of application 08/098,257 filed Jul. 29, 1993, now U.S. Pat. No. 5,438,225 which is a file wrapper continuation of application 07/832,122 filed Feb. 6, 1992, the disclosure of which is incorporated by reference herein.

BACKGROUND OF THE INVENTION

1. Field of the Invention

The invention relates to an annunciator device and more particularly an annunciator device which utilizes solar power to reduce or eliminate the necessity to draw power from external devices.

2. Description of the Related Technology

The annunciator and shutdown systems have many applications and may be used in connection with the control and/or protection of remotely located internal combustion engines. Such remote internal combustion engines are prevalent in oil field and pipeline applications for power and pumping stations. In such locations, there may not be a readily available electric power supply. Known annunciators such as that described in U.S. Pat. Nos. 4,246,493 and 4,336,463, expressly incorporated by reference herein, utilize a battery power supply in combination with a Capacitor Discharge (CD) ignition power supply. The ignition power supply operates during normal operation of the engine and a battery power supply delivers power to only a portion of the annunciator system when the engine is not operating.

All CD ignition powered annunciators have a significant drawback. The annunciator places a load on the CD ignition power supply, thereby reducing its energy level. In the field the CD ignition systems are often only marginally able to supply power to spark the engine and can ill afford the drain or load of an annunciator.

Annunciator and shutdown systems are important control features of remote engines. The annunciator monitors a plurality of parameters including oil pressure, temperature and other critical operational parameters. If one of these parameters is out of range, the monitoring circuitry of the system triggers the shutdown of the engine and displays the fault condition, generally according to a sensor number.

SUMMARY OF THE INVENTION

It is an object of the invention to provide an annunciator system which can operate for a long period of time under adverse conditions and without any external power drain or power system service requirements such as battery replacement. This object may be attained by an annunciator system which is primarily powered by solar energy. The solar energy is advantageously connected to a back-up battery which may be a NI-CAD battery. According to a preferred configuration, the system is made up of a segregated annunciator unit and a power supply and shutdown unit. Arrangement in two units is particularly advantageous in hazardous areas such as Class I Division 1 applications. The power supply unit is advantageously mounted in an explosion-proof box with a window for a photovoltaic cell. The power supply is advantageously connected to the annunciator unit by a shielded cable. The power supply unit may also be provided with connections for remote power supplies such as a remote photovoltaic cell or magnetic or inductive power supplies.

For non-hazardous applications, all the components may be mounted in a single housing. The annunciator unit includes electronic circuitry, sensor switch terminals for monitoring sensors and push buttons and display or other operator interfaces. The power supply unit components include a photovoltaic panel, a back-up battery, a battery charging circuit and alarm and shutdown inputs.

According to the invention, the shutdown trigger and annunciator may be made up of a fault detection unit which is responsive to a plurality of fault sensor inputs. A fault condition identification storage element is advantageously connected to the fault detection unit. According to one configuration, the fault detection unit can output a first signal indicative of a sensor scan and a second signal identifying a fault condition. Upon indication of a fault condition, the sensor identification may be stored in memory or latched into a register. The fault condition identification is then delivered to a display. Advantageously, a photoelectric power supply is connected at least to the fault condition identification storage element.

The photoelectric power supply may also be connected to supply all the components of the annunciator and shutdown system.

According to an advantageous embodiment, an activator is provided to trigger some action on detection of a fault. The action triggered would be to shut down an internal combustion engine by cutting off the fuel supply and/or shorting the ignition. Furthermore, the activator may set an alarm indicating a fault or shutdown.

The photoelectric power supply may be made up of a photovoltaic or solar cell which is connected through a battery charger to a rechargeable battery. The power supply can include a voltage regulator, featuring an appropriate voltage output level. The rechargeable battery powers the system when there is insufficient voltage levels generated by the photo cell.

The annunciator system may also include an auxiliary power supply connected to the photoelectric power supply. The auxiliary power supply may be a secondary or remote photoelectric generator, a magnetic pick-up power supply, a thermocouple or thermopile.

According to a further feature of the invention, the auxiliary power supply may be a CD ignition power supply of an internal combustion engine. The use of energy from the CD ignition power supply may be controlled by a voltage sensor which determines when the voltage level of the primary power supply falls below a predetermined level.

According to a further advantageous feature of the invention, the annunciator may be connected to a remote communication channel. The fault alarm and/or volt identification information may be transmitted over the remote communication channel.

The system according to the invention may be implemented using a conventional microprocessor programmed to carry out operations corresponding to the components described herein.

Further developments and features will become apparent from the detailed description of the preferred embodiment and the drawings.

DETAILED DESCRIPTION OF THE PREFERRED EMBODIMENT

Figure 1:
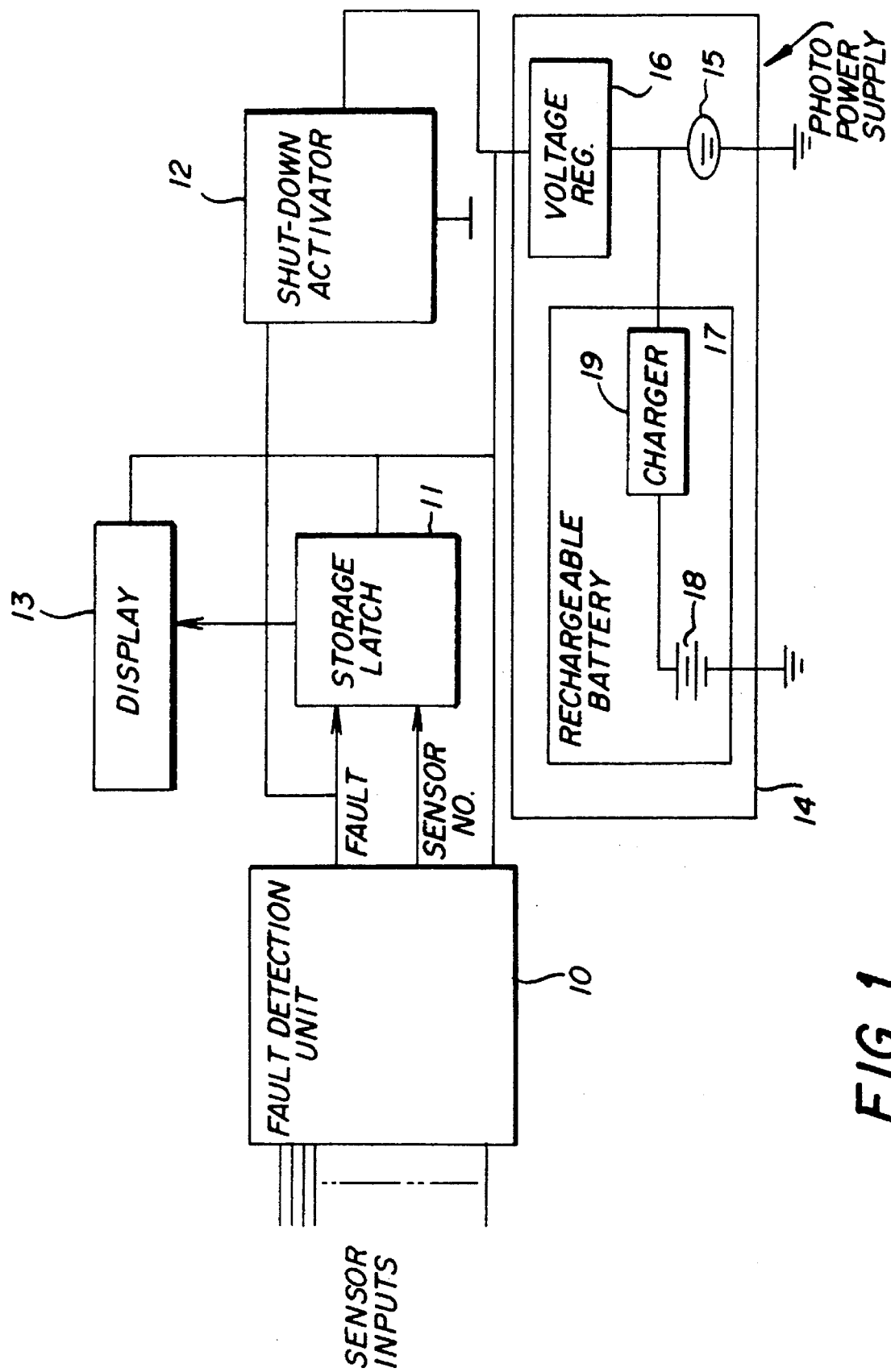
FIG. 1 shows a simplified block diagram of a shutdown and annunciator system according to the invention.

According to the invention, the annunciator may be implemented as a 32-channel multiplexer having data inputs for 32 sensors or switches. A switch may assume a number of the associated input channel. A tripped sensor may appear as a digital input to a multiplexer input line. The multiplexer sequentially scans the 32 input channels. According to the preferred embodiment, each sensor input may be scanned once every half second. In such a configuration any tripped sensor will be detected within a half second of being tripped.

Whenever a tripped sensor is detected, the signal is transferred by the multiplexer to an input register as a fault signal. The fault signal will set the register which then sends a signal to the power supply to turn on the shutdown and alarm output. Simultaneously, the input register may strobe a sensor number, stored in a channel number counter into a seven-segment display register. The sensor number may then be displayed on a liquid crystal or other display in a sensor-number window. The sensor number is advantageously retained in the display and the remaining sensor inputs may be disabled until the annunciator is manually reset.

A start-run timer power circuit within the annunciator allows time for the controlled system to come up to speed without being shut down by speed-dependent conditions. This is particularly important in the case of the internal combustion engine which requires time to build-up certain detected levels on start-up such as oil pressure. The timer may be initiated by the reset button. Initiation of the time period may be indicated in a start-run timer window of the display. As the start-run time elapses, the timer may count down to zero. A plurality of rocker switches may be provided to configure the sensor inputs for timed or non-timed inputs.

According to an advantageous feature, the system may have a test mode. In the test mode, the start-run timer provides a lock-out for the shutdown function so that all sensors may be tested. In this mode, the timer enables all sensors to be successively tripped and displayed in the sensor number display window while inhibiting shutdown due to tripped sensors until the time zero. The test function operates only after the system is started and up to speed. The system cannot be put in test mode until the run signal is received. This prevents start-up in test mode.

Pressing the test push button sets the unit into a test mode for the start-run timer. This mode may be indicated by a colon in the sensor timer window. In test mode, a shutdown function is locked out so that each sensor may be tested without shutting down the system. The same sensor may be tested without shutting down the system. Thus, each sensor may be tripped as the annunciator indicates the sensor number in the sensor number window.

After each sensor is tripped, the unit may be reset by push button. Each time the reset button is pressed, the timer count restarts at full count. The test ends when the timer counts down to zero or when the operator zeroes the timer by pressing a timer zero button. By forcing the timer to a zero count the test function may be terminated.

According to the invention the annunciator power supply is a photocell. The photo cell is connected with a battery to provide power even if insufficient light is incident on the cell. A charger may be connected to the cell in order to charge the battery during lit periods.

According to an advantageous feature, the annunciator may switch to ignition power whenever the battery is discharged below a predetermined level. An advantageously predetermined level may be set at 4.2 volts. According to the preferred embodiment, this level may be as low as 3.0 volts and operates effectively at 4.2 volts.

According to the preferred embodiment, the power supply section or unit provides the operating voltage to the annunciator and shutdown control circuits within the power supply. The power is primarily supplied by a 15-bolt 14.5 milliamp photovoltaic panel or by a magnetic pickup with a 6-volt DC secondary NI-CAD battery for backup power. When fully charged, the battery capacity is sufficient to stay in operation for a period of 150 hours. If, the battery voltage drops below 4 volts DC, the system may switch to the ignition system for secondary backup power. When battery voltage is above 4 volts DC, the ignition input is switched off and no current is drawn from the ignition system to the annunciator system. This allows the ignition system to operate at maximum efficiency with no current draw from the ignition system to the annunciator and shutdown system. The photovoltaic panel may be sized to provide sufficient energy to power the annunciator and charge the battery even on a generally rainy day.

Shutdown and alarm outputs may turn on when the annunciator detects a faulted sensor. These outputs are typically used to trip a fuel gas shutoff valve and/or to ground the ignition of an internal combustion engine whenever a fault is detected.

An ignition ground delay is advantageously provided in order to give the engine time for a fuel gas valve to be tripped and the engine to exhaust its remaining fuel supply prior to shorting the engine ignition. According to an advantageous feature, the ignition ground delay may be three to five seconds.

According to an advantageous feature, protective barriers may isolate the low-energy output from the high-energy supply circuits. Safety barriers in the system prevent any normal or abnormal power supply input from being transferred to the annunciator section, thus maintaining the intrinsic safety of the annunciator section.

The ignition input may turn on an ignition run switch. The ignition run switch enables the annunciator multiplexer channel scan sequence and allows the annunciator to monitor sensor inputs. It also enables the annunciator test function.

FIG. 1 shows a simplified block diagram of the system according to the invention. The shutdown trigger and annunciator system includes a fault-detection unit 10 which scans a plurality of sensor inputs in order to identify a fault condition. Upon detection of a fault condition, a fault condition indication is transmitted to a fault condition identification latch 11 and a shutdown activator 12. The fault detection unit also transmits a sensor identification signal to the fault condition identification storage element 11. Upon receipt of the fault condition signal, the fault condition identification storage element saves the fault condition identification signal and outputs the signal to a display 13. Upon detection of a fault, a shutdown activator effects a desired activity The activator may include an alarm signal generator, a fuel cutoff signal and/or an ignition short circuit.

The system also includes a photo electric power supply 14 with a photovoltaic cell 15 also known as a photoelectric generator. A photo electric power supply delivers operating power to the fault detection unit 10, the fault condition identification storage element 11, the shutdown activator 12, and the display 13. A photo electric power supply advantageously includes a voltage regulator 16 connected to the photovoltaic cell. A rechargeable battery power supply 17 is provided as a backup to the photovoltaic cell for use when there is insufficient solar radiation incident against the photo electric cell to operate the system. A rechargeable battery power supply includes a battery 18 and a battery charger 19.

Figure 2:
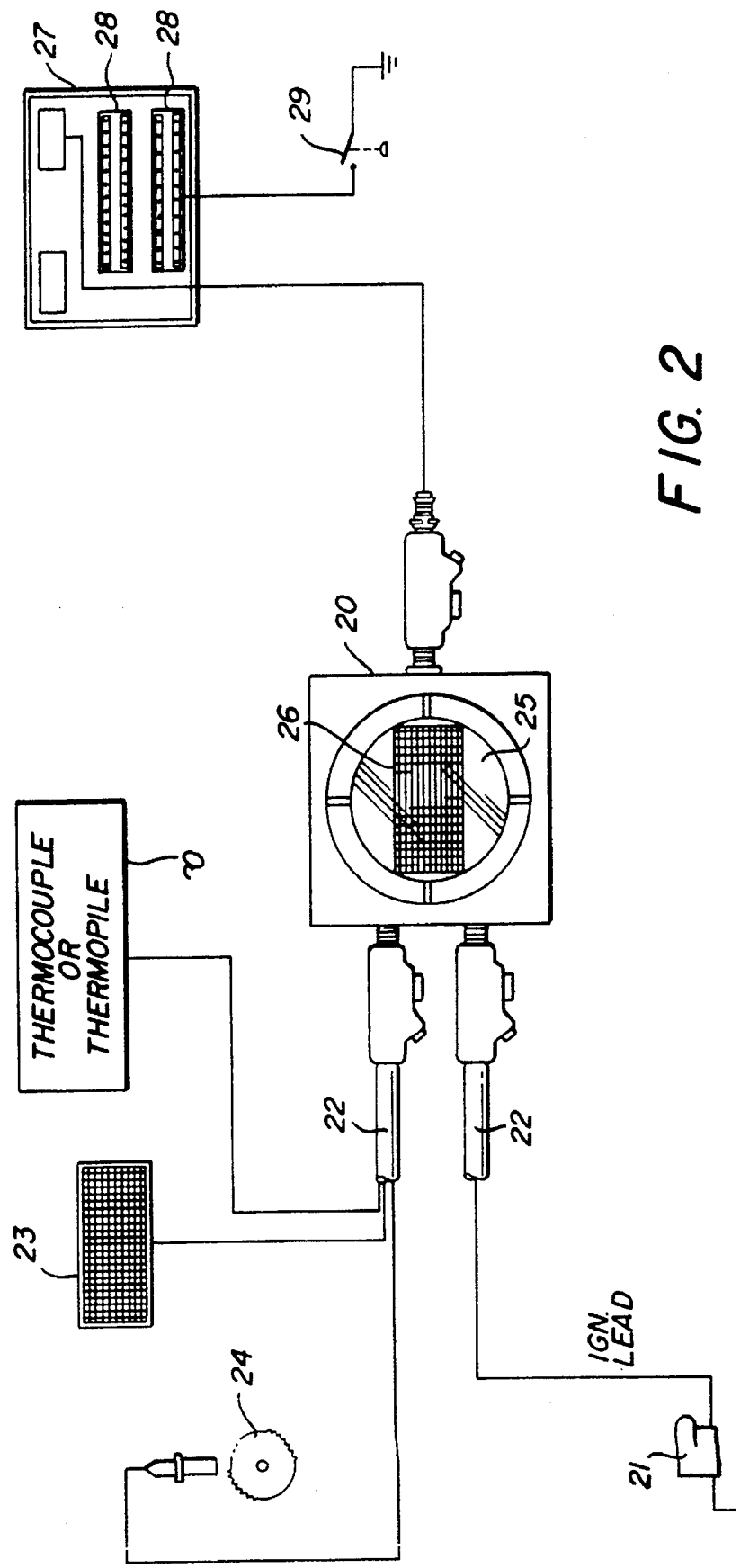
FIG. 2 shows a schematic diagram of the system according to the invention.

FIG. 2 shows a schematic diagram of the system. The system may be divided up into a power supply and shutdown unit 20 which may advantageously be contained in an explosion-proof junction box. According to the preferred embodiment, a power supply and shutdown unit may be connected to a CD ignition system 21 of an internal combustion engine through a conduit 22. The power supply and shutdown unit may also be connected to auxiliary power supply such as an auxiliary photo electric cell 23 thermocouple or thermopile 30, or an optional magnetic pickup 24. The ring gear of the magnetic pickup may advantageously be mounted on a rotating shaft of the internal combustion engine. The power supply and shutdown unit may advantageously include a window 25 to provide a light passageway for a first photovoltaic cell 26, also known as a photoelectric generator.

While the system is primarily designed for use as a shutdown and annunciator system for remotely located internal combustion engines, it will be appreciated by those of ordinary skill in the art that the system has far-reaching control system applications. For example, the system may be utilized as a security system for use in conjunction with commercial, residential or industrial fire and burglar alarms. The maintenance-free, independent and isolated power supply are particularly advantageous for these applications. A system also has applications for industrial process system monitoring such as may be necessary in factories, production lines, oil refineries or other chemical processing installations. A power supply and shut down unit is advantageously connected to an annunciator system 27. Annunciator system 27 includes a display and a plurality of sensor inputs 28. Each sensor input may be connected to a mechanically actuated sensor switch 29.

The numerous descriptors such as R, CR, C, VDD, and TS shown in FIGS. 3–5 that are not associated with reference numerals and discussed separately below simply represent standard nomenclature for the items as illustrated.

Figure 3:
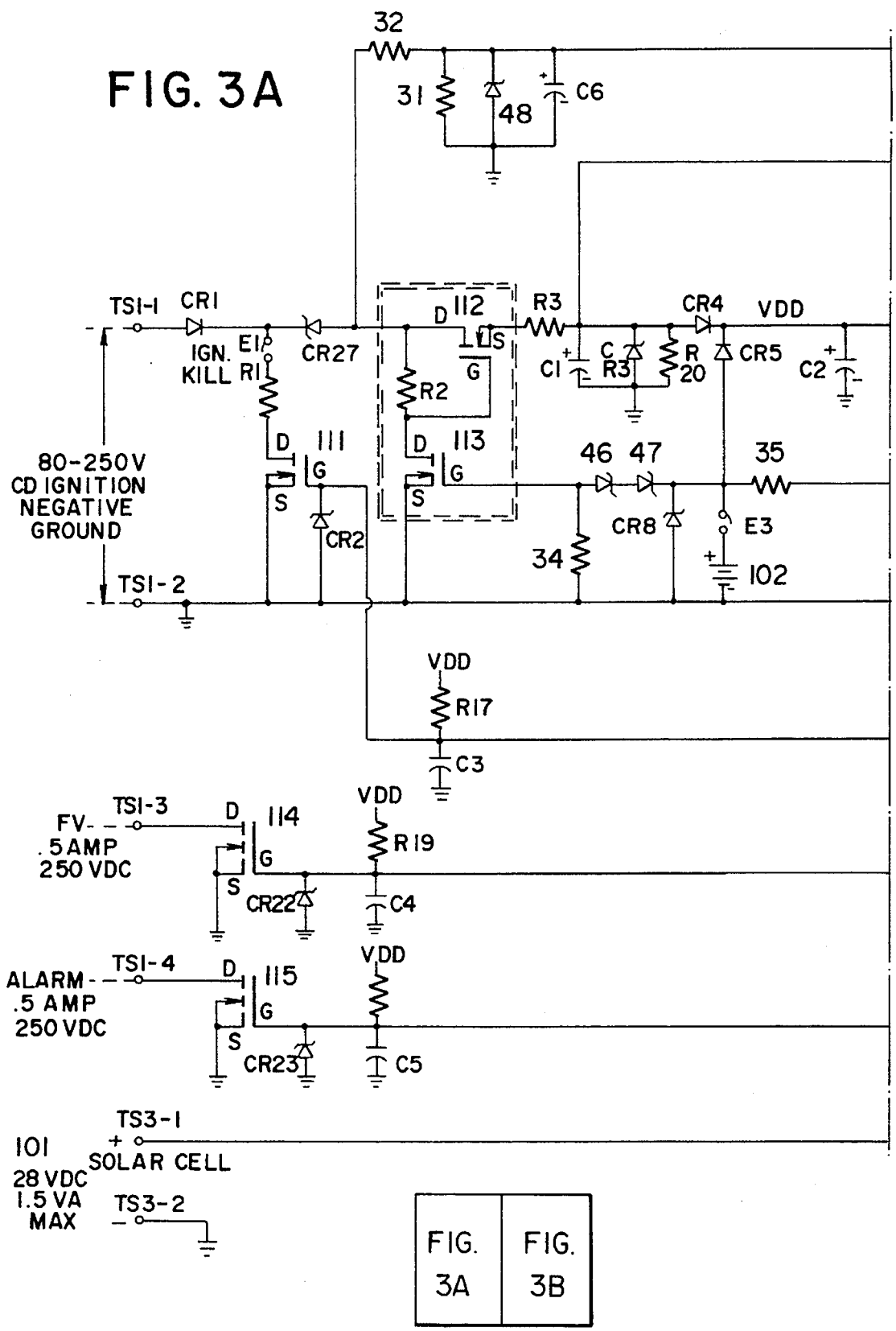
FIG. 3 shows a schematic diagram of the power supply and shutdown unit according to the invention.
Figure 3B:
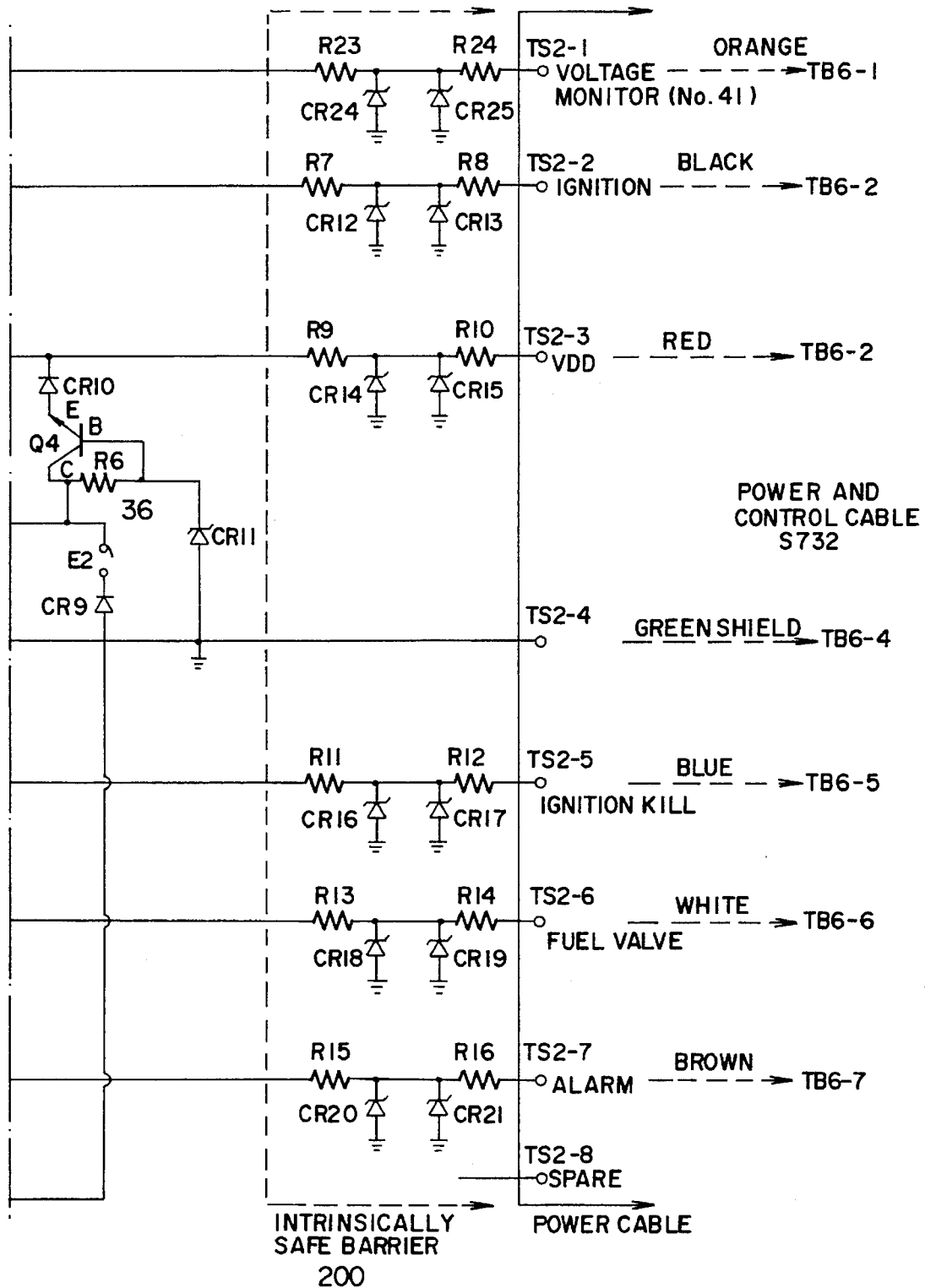

FIG. 3 shows the power supply and shutdown unit. The power supply may be mounted on the back of the annunciator and connected to the power and control bus. Alternatively, the power supply may be mounted in an explosion proof junction box and connected to the annunciator with a cable. An intrinsically safe barrier 200 mounted in the explosion proof junction box is connected in series with the power supply output and cable. Primary power input into the power supply is from 10–28 VDC at 1.5 VA. Under normal operating conditions, the source is a photo-voltaic cell 101. The secondary source is a ni-cad 6 VDC battery 102, which is charged by photo-voltaic cell during normal operating conditions. The battery is able to power the annunciator for more than 1500 hours.

An important feature of this system is its ability to operate without loading the ignition. This is accomplished through the use of the primary voltage monitoring circuit. This circuit includes switches 112 and 113, diodes 46 and 47, and resistor 34. This circuit only switches to the ignition as a backup, in the event that the primary and secondary voltages drop below a specified voltage.

When the primary and secondary voltages drop to approximately 4.2 V, switch 113 turns off allowing switch 112 to turn on. This switches the power to the annunciator unit from the photo voltaic cell, to the ignition. This switch over may be annunciated by a blinking decimal point on a LCD (see FIG. 4, liquid crystal display 128). The ignition voltage and photo voltaic cell voltage are both monitored. During engine operation, the ignition voltage is monitored by a circuit consisting of resistors 31 and 32, diode 48, switch 111, and resistors 35 and 36. A fault signal is annunciated upon detection of the ignition voltage falling below 75 V. This fault signal may be connected to the shutdown activators. According to the preferred embodiment, the shutdown activators include a fuel valve cutoff switch 114 and an alarm switch 115. The primary voltage monitor circuit switches power back to the photo-voltaic cell when the voltage at switch 112 rises above 4.5 V, unloading the ignition.

Figure 4A:
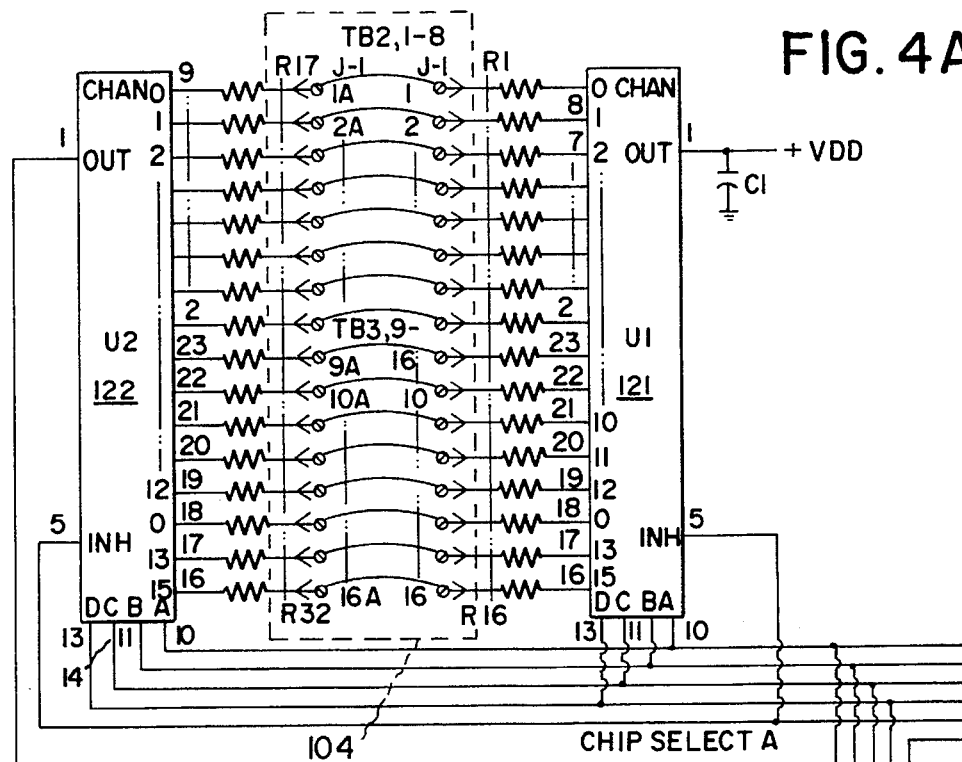
FIG. 4 shows a schematic diagram of the annunciator section according to an embodiment of the invention.
Figure 4:
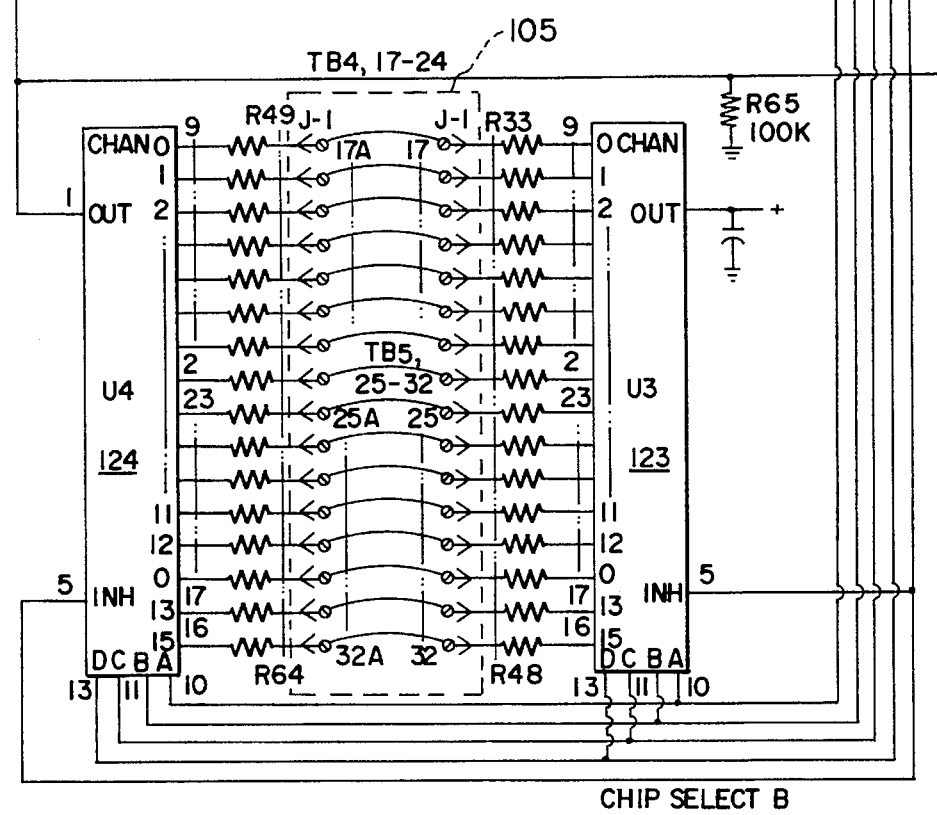
Figure 4:
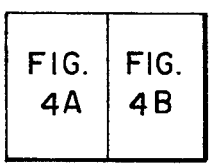
Figure 4B:
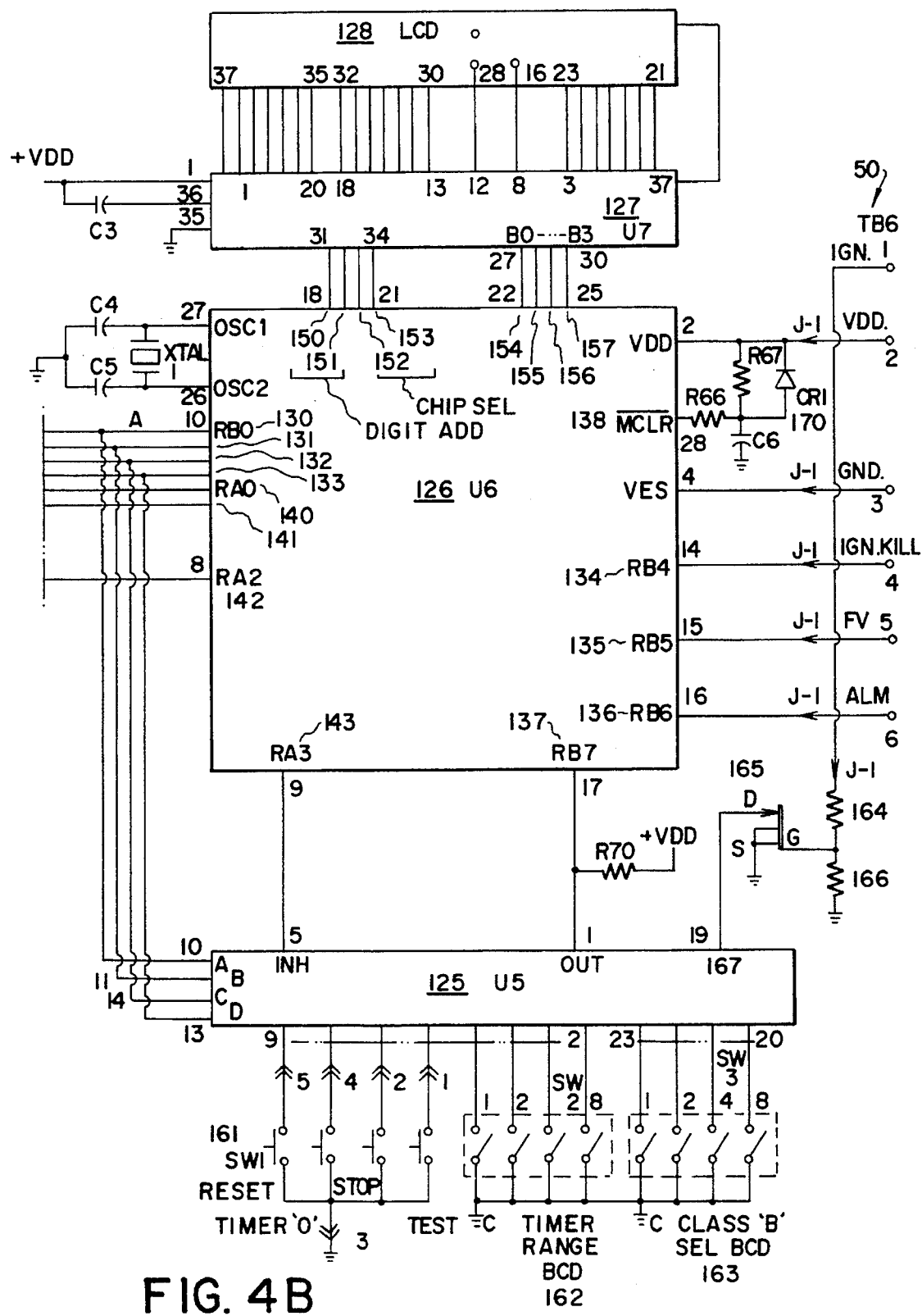

FIG. 4 shows an annunciator unit. The annunciator consists of a low-power 8 bit CMOS microcomputer 126 which operates in conjunction with five 16 channel multiplexers 121–125 for input expansion, a four digit liquid crystal display driver 127 and a four digit liquid crystal display 128. The microcomputer performs all addressing, timing and sequential logic functions for the annunciator system. The system monitors up to 32 sensor input switches. When a fault is detected, the annunciator displays the sensor number and turns on the alarm and shut down outputs.

Multiplexers 121–124 are used to monitor i through 32 sensor inputs. Digitally controlled analog switches 104, 105 are connected to the sensor inputs. In operation, the microcomputer sequentially selects the sensor inputs by first storing the multiplexer address code at ports 140 and 141, and channel address at ports 130–133. The computer tests for a faulted sensor by reading port 142 which monitors the output of the sensor input multiplexers 122 and 124. The first 16 inputs are selected by addressing multiplexers 121 and 122. Inputs 17 through 32 are selected by addressing multiplexers 123 and 124. Multiplexers 121 and 123 are used to select the pull-up resistor for the sensor input. Multiplexers 122 and 124 are used to select the input to be read by the microcomputer, thus the pull-up resistor and sensor input multiplexers are addressed simultaneously.

If port 142 indicates a faulted sensor, the shutdown and alarm sequence is initiated. Next, the microcomputer addresses the display driver 127 through output ports 150–157. The microcomputer loads the sensor address or number to output port 154–157. It then latches the sensor number into the display driver by placing the digit and chip select address at port 150–153. The display driver decodes the hexadecimal sensor number and then displays the decimal equivalent on the seven segment LCD.

Multiplexer 125 polls operator input from four button membrane switch 161, two binary coded decimal (BCD) switches 162, 163 and ignition failure signal 167. Multiplexer 125 is selected by port 143. Inputs are addressed by the multiplexer channel select bus 137. Membrane switch 161 may be used to control the reset, timer zero, stop and test functions. BCD switch 162 may be used to select a timer range between zero and nine minutes. BCD switch 163 may be used to select zero to nine of the first nine sensor inputs as Class "B" sensor inputs. The ignition failure signal input 167 monitors ignition voltage and annunciates loss of ignition voltage.

The annunciator section may be provided with the ignition signal input 50 connected to a resistor 164 and a transistor 165. The diode 170 output may advantageously be connected to the sensor scan enable input 138. Furthermore, a resistor 166 may be connected between an output of transistor 165 and ground. This configuration allows a complete prestart scan of the sensor channels.

Figure 5A:
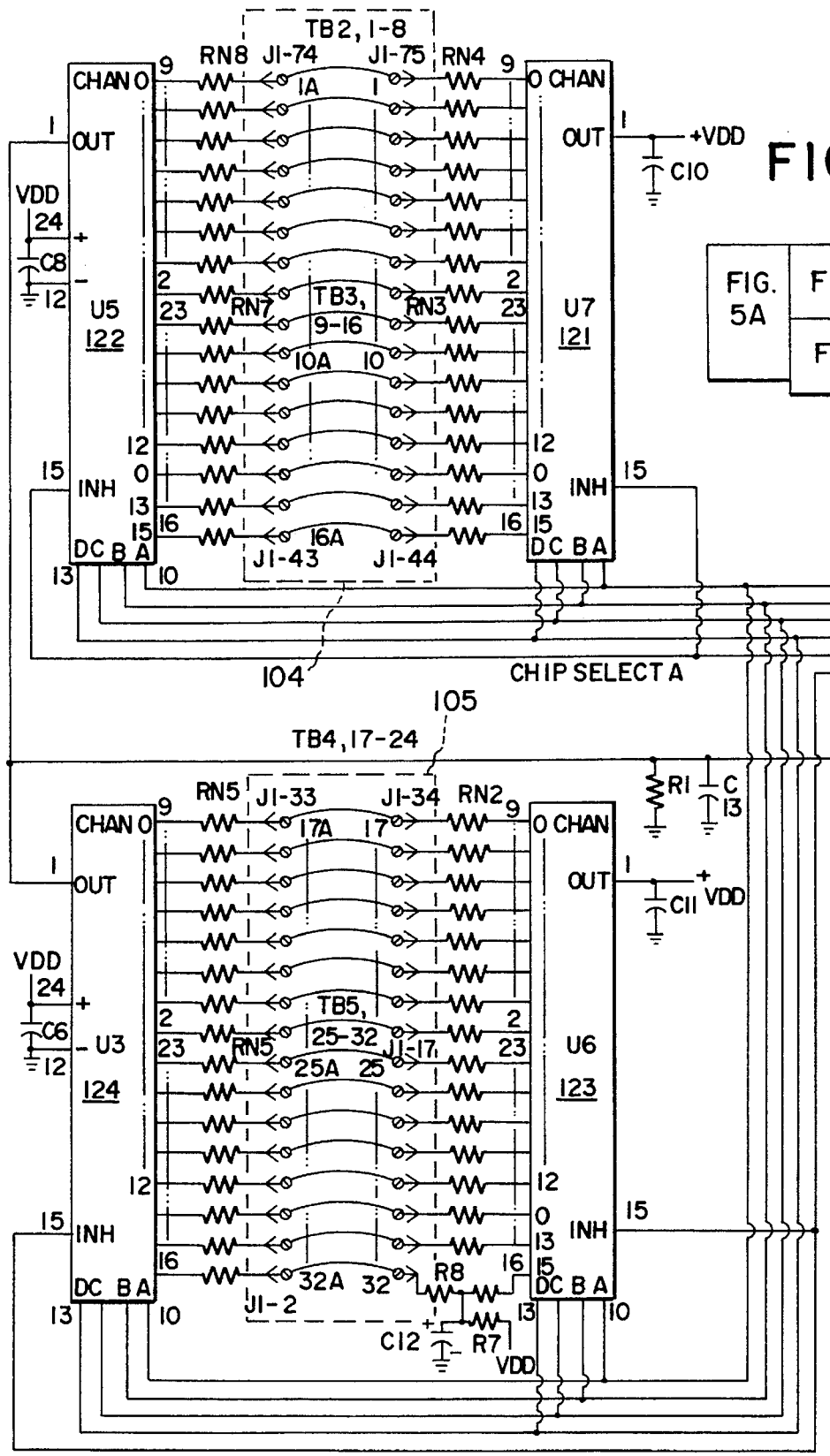
FIG. 5 shows a schematic diagram of the annunciator section according to an alternative embodiment of the invention.
Figure 5B:
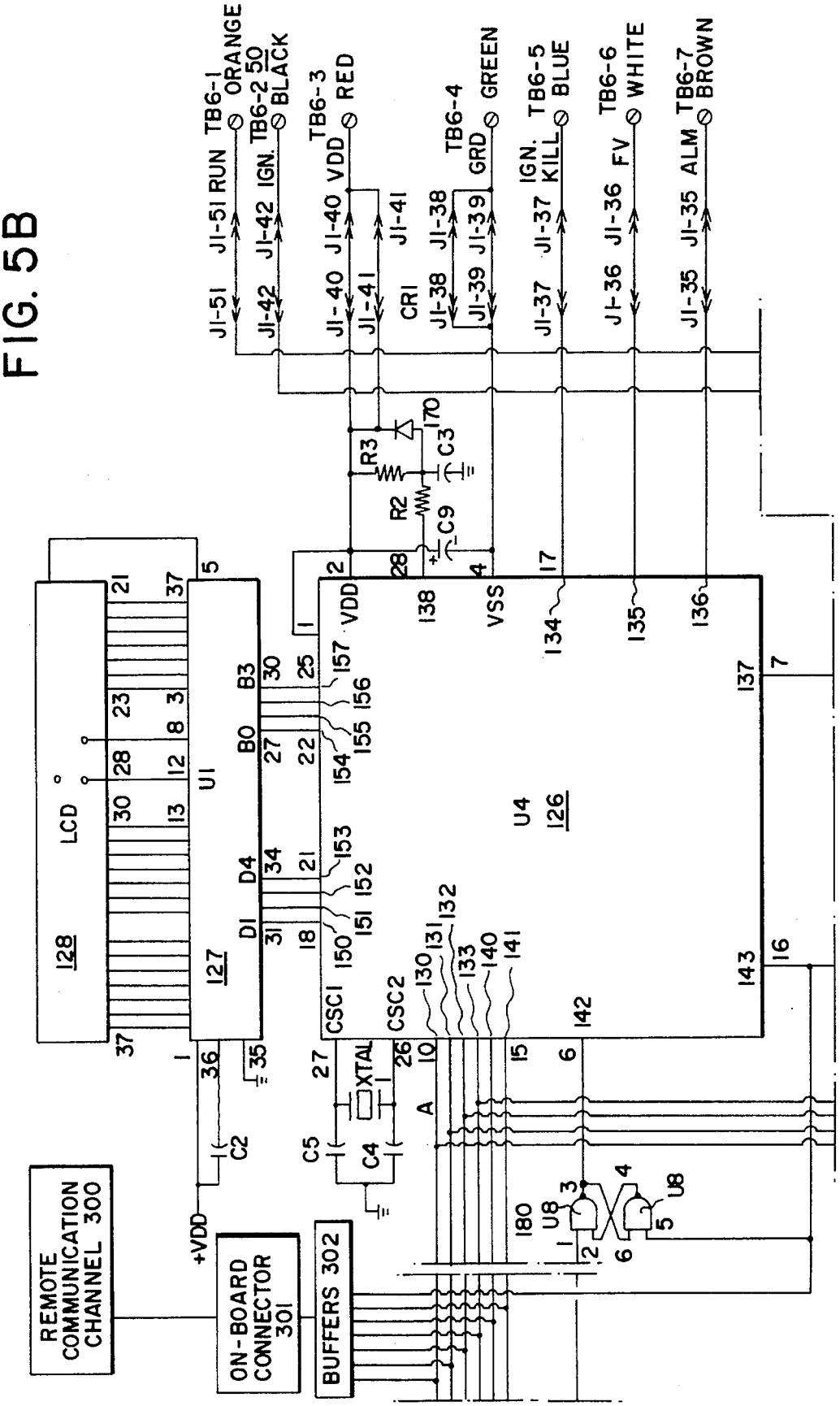
Figure 5C:
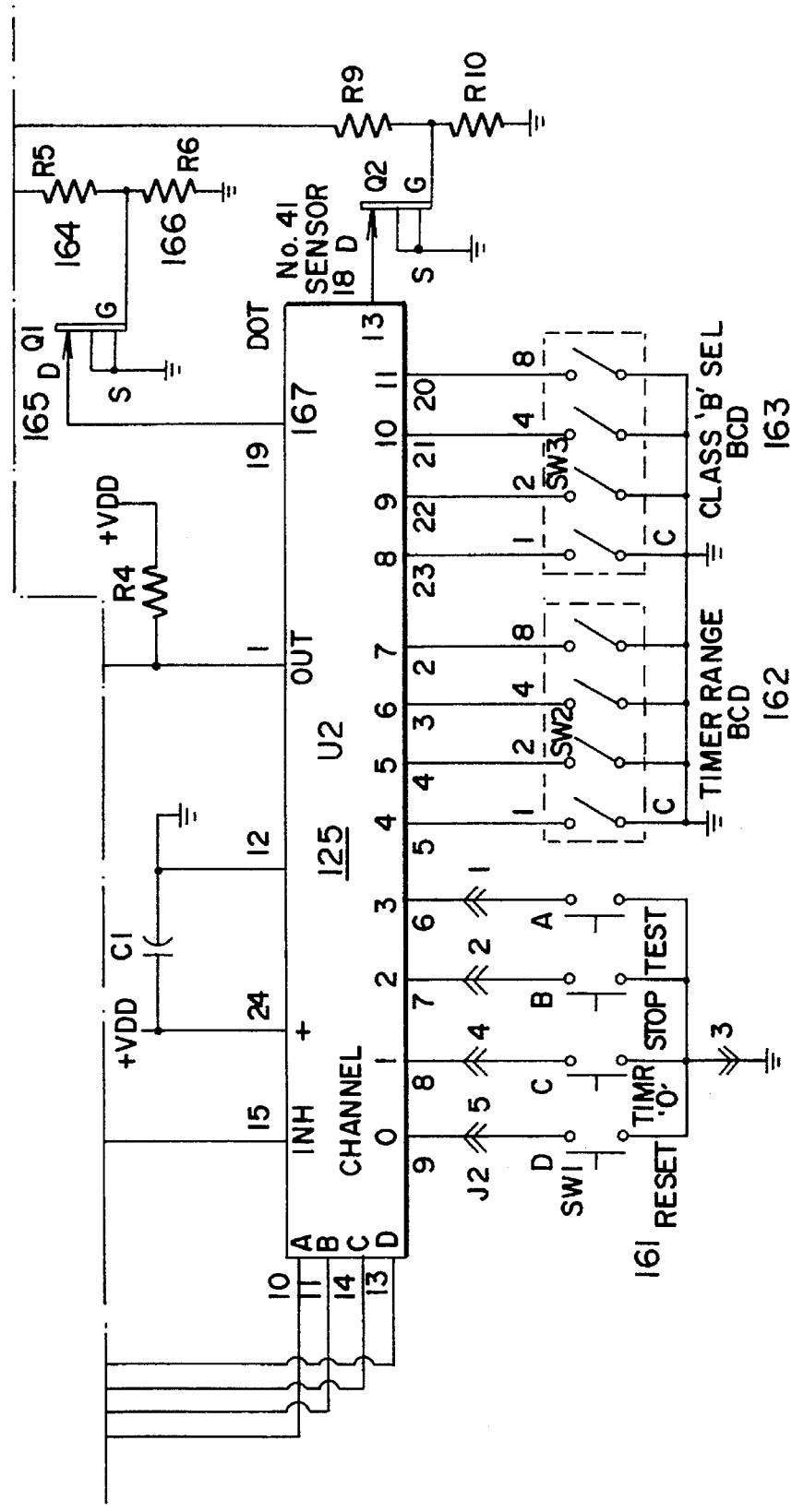

FIG. 5 shows an alternative embodiment of the annunciator unit as shown in FIG. 4. The annunciator unit is similar to the annunciator unit in FIG. 4, wherein like numerals indicate like components, except that it includes a NAND flip-flop 180 connected between the multiplexer units 122, 124, 125 and the microprocessor input port 142. A fault detected at either of these sensor input multiplexers 122 and 124 or at the operator input multiplexer 125 is latched into the NAND flip-flop 180 and is then read by the microprocessor 126 at port 142 and the shutdown and alarm sequence is initiated.

The microcomputer turns on output ports 135 and 136 which turns on switches 114 and 115 in the power supply shown in FIG. 3 . Normally these outputs are used to control a fuel gas shutoff and alarm. After approximately 3–5 seconds, when the engine has exhausted its remaining fuel supply, output port 134 turns on switch 111 shown in FIG. 3, which grounds the ignition. The microprocessor 126 then addresses the display driver 127 through output ports 150–157. The faulted sensors number is transferred, through pins 154–157, to the LCD 128.

The multiplexer address and decoder lines 130–133, 140, 141, and 143 can be fed into an onboard connector 301 through a series of buffers 302. This connector can be a standard D-Sub-Type, allowing for off board communication through remote communication channel 300 of the fault occurrence using a 7-bit straight binary code.

The preferred embodiment is described by way of illustration. The description of the preferred embodiment is not intended to limit the scope of the claims. One of ordinary skill in the art would recognize that various modifications to the described preferred embodiment may be made without departing from the spirit and scope of the invention.

I claim:

1. An actuator and annunciator comprising:

a microprocessor-based fault detection unit responsive to a plurality of fault condition sensor inputs;

a fault condition identification storage element connected to said fault detection unit;

a display connected to said fault condition identification storage element;

a photoelectric power supply connected to said fault condition identification storage element;

a backup power supply source connected to said photoelectric power supply wherein said backup power supply includes a battery and a battery charger connected to said battery and to said photoelectric power supply;

a voltage sensor connected to said backup power supply source;

an auxiliary power supply connected to said fault condition identification storage element;

a switch, controlled by said voltage sensor, connected between said auxiliary power supply and said fault condition identification storage element, wherein said switch and said voltage sensor are configured to disconnect said auxiliary power supply from said fault condition identification storage element when a voltage of said backup power supply exceeds a predetermined level and to connect said auxiliary power supply when said voltage falls below said pre-determined level; and means for isolating said auxiliary power supply from said photoelectric power supply and said backup power supply to allow the photoelectric power supply to charge the battery and preventing the auxiliary power supply from charging the battery.

2. An actuator and annunciator according to claim 1, further comprising:

an activator responsive to said fault detection unit.

3. An actuator and annunciator according to claim 2, wherein said photoelectric power supply comprises:

a photoelectric generator; and wherein said backup power supply source is connected to said photoelectric generator.

4. An actuator and annunciator according to claim 2, wherein said activator comprises a fuel supply cut-off activator.

5. An actuator and annunciator according to claim 4, wherein said activator further comprises an activation delay device and an engine ignition shut-off switch connected to said delay device.

6. An actuator and annunciator according to claim 2, wherein said activator is connected to a remote communication channel.

7. An actuator and annunciator according to claim 6, wherein said remote communication channel is connected to said fault condition identification storage element.

8. An actuator and annunciator according to claim 1, further comprising a housing and wherein said photoelectric generator and said activator are located in said housing.

9. An actuator and annunciator according to claim 1, further comprising a remote power supply connected to said photoelectric power supply.

10. An Actuator and annunciator according to claim 7, wherein said remote power supply is a second photoelectric generator.

11. An actuator and annunciator according to claim 1, further comprising a remote power supply connected to said photoelectric power supply wherein said remote power supply is a magnetic pickup power supply.

12. An actuator and annunciator according to claim 1, further comprising a remote power supply connected to said photoelectric power supply wherein said remote power supply is a thermocouple.

13. An actuator and annunciator according to claim 1, further comprising a remote power supply connected to said photoelectric power supply wherein said remote power supply is a thermopile.

14. An actuator and annunciator according to claim 1, wherein said auxiliary power supply comprises an internal combustion engine ignition power supply.

15. An actuator and annunciator according to claim 1, wherein said photoelectric power supply further comprises a voltage regulator.

16. An actuator and annunciator according to claim 1, wherein said fault detection unit comprises:

a microprocessor;

a multiple channel multiplexer connected to said plurality of fault condition sensor inputs and having channel selection inputs connected to said microprocessor;

a first latch connected to an input of said microprocessor and triggered by a signal obtained from said multiplexer.

17. An actuator and annunciator according to claim 16, further comprising:

a plurality of digitally controlled analog switches connected to said sensor inputs of said multiplexer; and a disable signal generator connected to control inputs of said analog switches.

18. An actuator and annunciator according to claim 17, wherein said disable signal generator is a start/run timer.

19. An actuator and annunciator according to claim 17, wherein said disable signal generator further comprises an annunciator test circuit.

20. An actuator and annunciator according to claim 16, wherein said latch comprises a NAND Flip-Flop unit.

21. An actuator and annunciator according to claim 1, further comprising:

an intrinsically safe barrier connected between said photoelectric power supply and said fault condition identification storage element.

* * * * *